(12) United States Patent
Ryan et al.

(10) Patent No.: US 8,235,432 B2
(45) Date of Patent: Aug. 7, 2012

(54) SUPPLEMENTAL SIDE IMPACT PROTECTION SYSTEM FOR AUTOMOTIVE VEHICLE

(75) Inventors: Sean Ryan, Farmington Hills, MI (US); Rich Ruthinowski, Taylor, MI (US); Manoharprasad K. Rao, Novi, MI (US)

(73) Assignee: Ford Global Technologies, Dearborn, MI (US)

( * ) Notice: Subject to any disclaimer, the term of this patent is extended or adjusted under 35 U.S.C. 154(b) by 1186 days.

(21) Appl. No.: 11/938,569

(22) Filed: Nov. 12, 2007

(65) Prior Publication Data

US 2008/0061566 A1    Mar. 13, 2008

Related U.S. Application Data

(62) Division of application No. 11/278,017, filed on Mar. 30, 2006, now abandoned.

(51) Int. Cl.
*B60R 19/42* (2006.01)
*B60R 3/02* (2006.01)

(52) U.S. Cl. .............. 293/118; 293/128; 296/187.12; 280/163; 280/166

(58) Field of Classification Search .......... 293/126, 293/128, 116, 118; 296/187.12; 280/163, 280/164.1, 166
See application file for complete search history.

(56) References Cited

U.S. PATENT DOCUMENTS

| | | | |
|---|---|---|---|
| 1,513,257 A | 10/1924 | McGowen | |
| 4,592,571 A * | 6/1986 | Baumann et al. | 280/756 |
| 5,193,869 A | 3/1993 | Land | |
| 5,358,268 A * | 10/1994 | Hawkins | 280/166 |
| 5,518,283 A * | 5/1996 | Egelske | 293/128 |
| 5,584,493 A * | 12/1996 | Demski et al. | 280/166 |
| 5,697,626 A | 12/1997 | McDaniel et al. | |
| 6,158,756 A * | 12/2000 | Hansen | 280/166 |
| 6,325,397 B1 | 12/2001 | Pascoe et al. | |
| 6,435,534 B1 * | 8/2002 | Stone | 280/163 |
| 6,726,260 B1 | 4/2004 | Wang et al. | |
| 6,926,295 B2 * | 8/2005 | Berkebile et al. | 280/166 |
| 6,955,370 B2 * | 10/2005 | Fabiano et al. | 280/163 |
| 7,017,927 B2 * | 3/2006 | Henderson et al. | 280/166 |
| 7,070,194 B2 * | 7/2006 | Garland et al. | 280/166 |
| 7,077,440 B1 * | 7/2006 | Morales et al. | 293/128 |
| 7,118,120 B2 * | 10/2006 | Lee et al. | 280/166 |
| 7,188,875 B2 * | 3/2007 | Norelius | 293/128 |
| 7,234,716 B2 * | 6/2007 | Stevenson | 280/166 |
| 7,287,771 B2 * | 10/2007 | Lee et al. | 280/166 |
| 7,318,596 B2 * | 1/2008 | Scheuring et al. | 280/166 |
| 2003/0006575 A1 * | 1/2003 | Genis et al. | 280/163 |
| 2004/0254729 A1 | 12/2004 | Browne et al. | |
| 2005/0012295 A1 | 1/2005 | Chevalier et al. | |

* cited by examiner

*Primary Examiner* — Glenn Dayoan
*Assistant Examiner* — Gregory Blankenship
(74) *Attorney, Agent, or Firm* — Jerome R. Drouillard; Greg P. Brown (57) ABSTRACT

A supplemental impact protection system for an automotive vehicle includes an external energy management structure having a first position for normal vehicle operation and a second position for deployment during an impact event. A mounting system allows selective positioning of the energy management structure in either the first or second position, as determined by a controller which assesses an impact potential of the vehicle and operates the mounting system to move the energy management structure to the second, or deployed, position in the event that the assessed impact potential satisfies a predetermined threshold.

3 Claims, 8 Drawing Sheets

SUPPLEMENTAL SIDE IMPACT PROTECTION SYSTEM FOR AUTOMOTIVE VEHICLE

The present application is a Divisional of U.S. patent application entitled SUPPLEMENTAL SIDE IMPACT PROTECTION SYSTEM FOR AUTOMOTIVE VEHICLE having Ser. No. 11/278,017 and filed on Mar. 30, 2006, hereby incorporated by reference.

BACKGROUND OF THE INVENTION

1. Field of the Invention

The present invention relates to a supplemental side impact protection system for an automotive vehicle.

2. Disclosure Information

The presence of bumpers at the opposite ends of conventional passenger vehicles, coupled with the considerable crush space afforded by an engine compartment, generally located in the front of a vehicle, and a luggage compartment, generally located in the rear, have greatly facilitated the energy management required during impact events directed to the front and rear portions of conventional vehicles. At the sides of most vehicles, however, the crush distances are much less than those typically available for the front and rear of the vehicle. Moreover, the doors and rocker panels of most vehicles do not readily lend themselves to incorporation of the structures typically used for energy management in the front and rear bumpers of such vehicles.

The present invention provides supplemental side impact protection by means of a deployable energy management structure which is deployed by an electronic system controller according to a predetermined logic sequence. Although it is known in the art to have nerf bars which are raised manually to protect the sides of a vehicle, such bars are neither automatically deployed, nor, for that matter, are they deployable in real time in response to an assessment performed in real time either prior to, or during an impact. The present system solves problems associated with prior art deployable side safety beams by providing an external energy management structure which is deployable according to the results of a risk assessment performed by an onboard controller.

SUMMARY OF THE INVENTION

A supplemental impact protection system for an automotive vehicle includes an external energy management structure having a first position utilized for normal vehicle operation and a second, or deployed, position for use during an impact event. A mounting system fastens the energy management structure to the vehicle and selectively positions the energy management structure in either the first position or the second position. A controller assesses the impact potential of the vehicle and operates the mounting system to move the energy management structure to the second position in the event that the assessed impact potential satisfies a predetermined threshold. An external energy management structure according to the present invention may comprise a deployable beam extending along at least a portion of the exterior of the vehicle. Such beam may be either a running board, or a step bar, or a side guard beam, or other types of similar devices known to those skilled in the art and suggested by this disclosure.

According to another aspect of the present invention, an external energy management structure according to this invention is actuated by a mounting system including either a pyrotechnic device, or an electric motor. These devices move the energy management structure into its second, or deployed, position.

According to another aspect of the present invention, an impact potential threshold may include predictive sensing of an impact by means of a pre-crash sensor, or sensing of operation of the vehicle in a forward gear, or operation at a particular ground speed. A controller for operating the present energy management structure would typically include one or more accelerometers to track impact events. Further, the system controller may operate not only the present energy management structure mounting system, but also at least one supplemental restraint device installed in a vehicle.

According to another aspect of the present invention, a method for operating a supplemental impact protection system for an automotive vehicle includes the steps of sensing at least one vehicle operating parameter, assessing an impact potential of the vehicle based upon at least the sensed value of the operating parameter, and deploying an external energy management structure having a first position for normal vehicle operation and a second position for deployment during an impact event, based upon the assessed impact potential of the vehicle. The vehicle operating parameter sensed by the present system may, for example, be a measure of reduced proximity to another vehicle, which measurement may be accomplished by means of a pre-crash sensor.

It is an advantage of a protection system according to the present invention that the impact protection of a vehicle may be enhanced without the need for providing additional structures, inasmuch as a step bar, running board, or guard beam according to the present invention may be used for the dual purposes of entering the vehicle, as well as for providing side impact protection. This dual purpose also reduces the weight and complexity of the vehicle.

It is a further advantage of a system according to the present invention that the supplemental side impact protection may be provided in real time through the use of pyrotechnic or compressed gas devices.

It is yet a further advantage of a system according to the present invention that a vehicle may be protected from impacts resulting not only from roadway collisions, but also from parking lot impacts.

Other advantages, as well as objects and features of the present invention, will become apparent to the reader of this specification.

BRIEF DESCRIPTION OF THE DRAWINGS

FIG. 1 is a perspective view of a pickup truck having a supplemental impact protection system, shown as a deployable side step bar, according to one aspect of the present invention. FIG. 1 also shows a bumper of a vehicle moving into strike the illustrated vehicle.

DETAILED DESCRIPTION OF THE PREFERRED EMBODIMENTS

Figure 1:
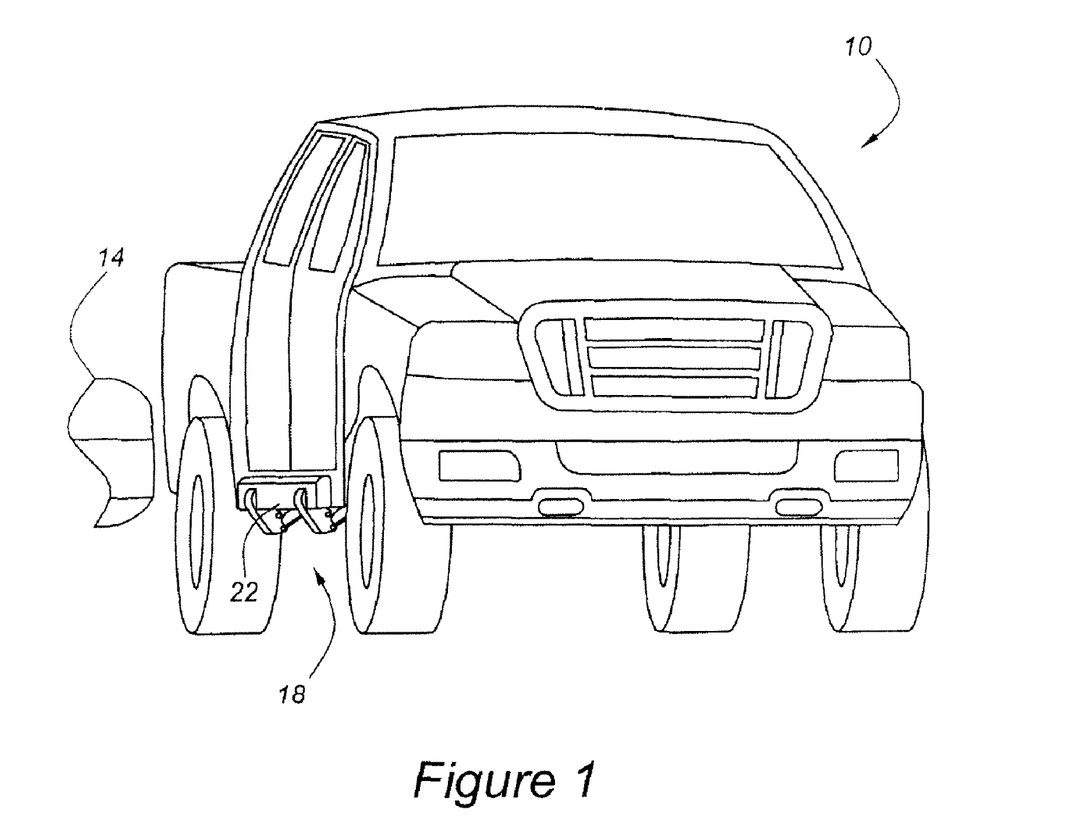

As shown in FIG. 1, vehicle 10 has a supplemental impact protection system, 18, with an external energy management structure including step beam 22, which has been rotated into a protective operating position. Beam 22 functions as an external energy management structure by resisting bending, buckling and twisting during impact events. FIG. 1 also shows bumper 14 of a striking vehicle which is moving into position to strike step beam 22, rather than the doors of vehicle 10.

Figure 2A:
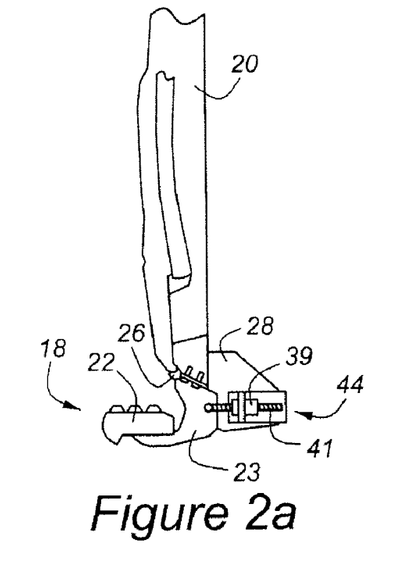
FIGS. 2a and 2b are sectional views showing the protective step bar of FIG. 1 in a normal operating position, and a deployed position, respectively.

As shown in FIG. 2a, step beam 22 normally resides below door 20. Step beam 22 is mounted upon a plurality of body brackets, 23. Each body bracket 23 is rotatably mounted at a hinge point, 26, to body 28 of vehicle 10. Those skilled in the art will appreciate in view of this disclosure that body 28 may comprise either a unitized body, or a body or frame portion of a separate frame and body vehicle.

Figure 2B:
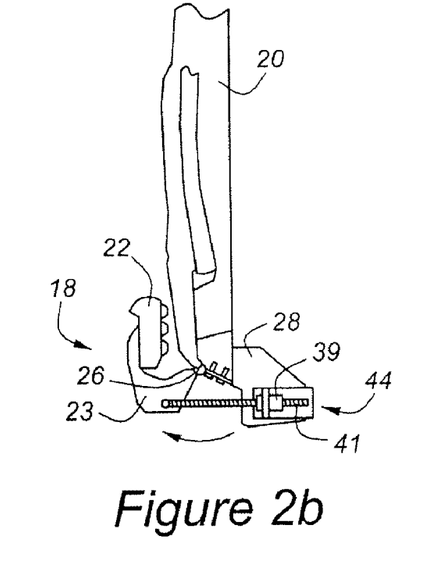
Figure 5:
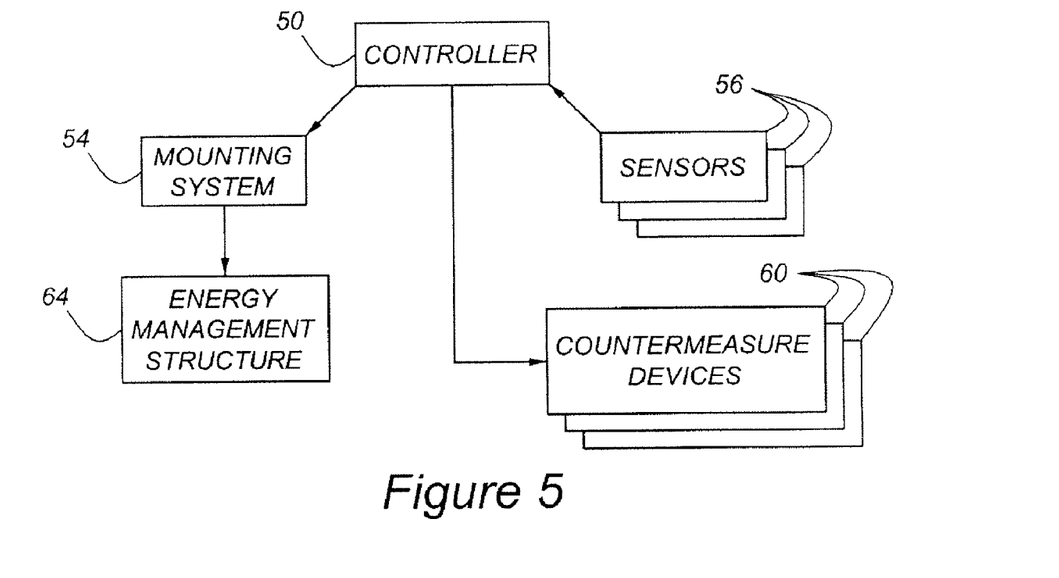
FIG. 5 is a block diagram illustrating a system according to the present invention.
Figure 6:
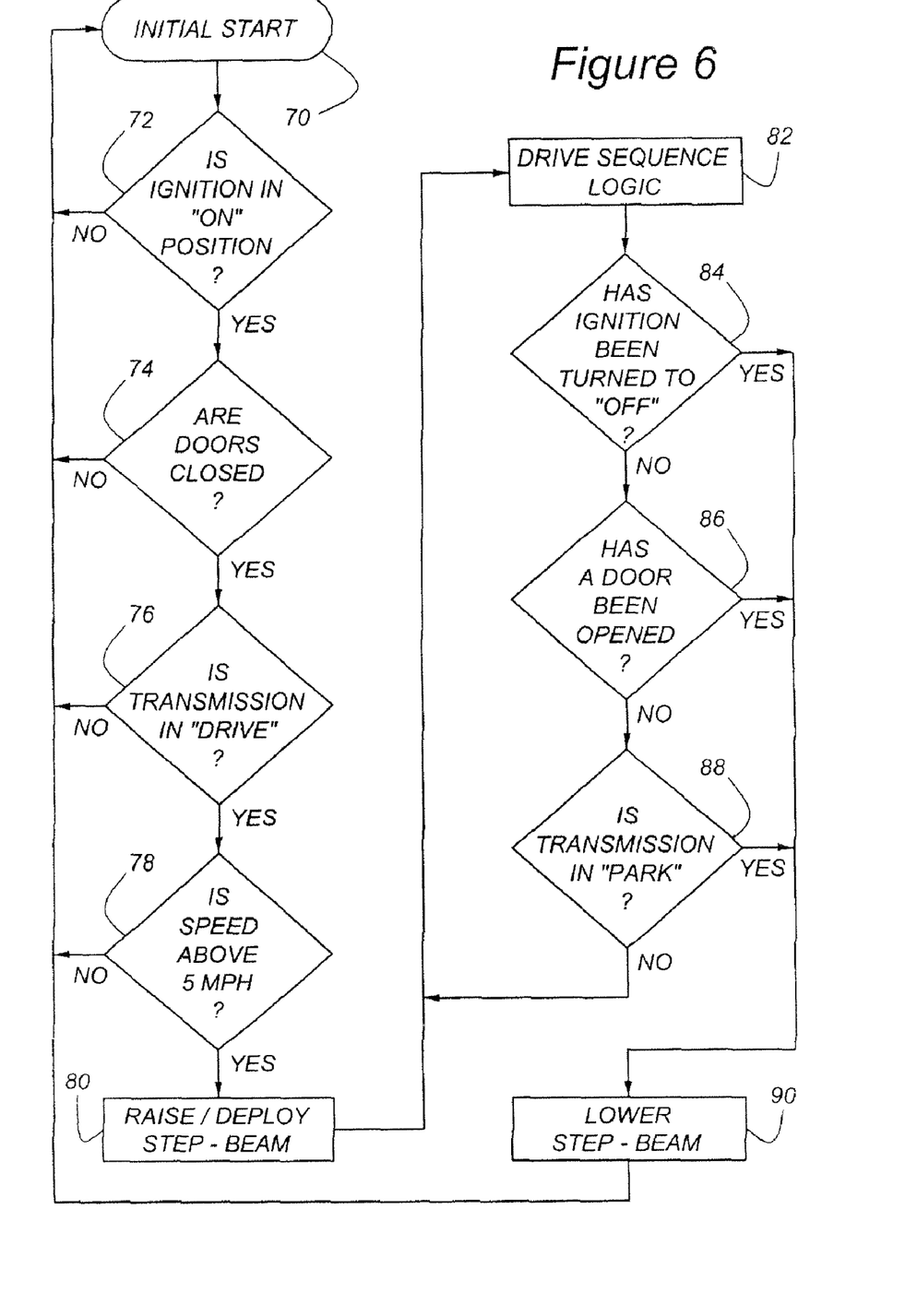
FIG. 6 is a flow chart illustrating one method employing a system according to the present invention.

In FIG. 2b, step beam 22 is in its second, or deployed, position. This may also be termed an elevated position. When placed in this position, step beam 22 acts as a countermeasure against the intrusion of a striking object, such as the illustrated bumper 14. Beam 22 and brackets 23 are rotated about hinge points 26 by means of a linear motor or pyrotechnic device. In the embodiment illustrated in FIGS. 2a and 2b, linear motor 44 uses motor element 39 and lead screw 41 to raise step beam 22 in response to commands from a controller (FIGS. 5 and 6).

Figure 3A:
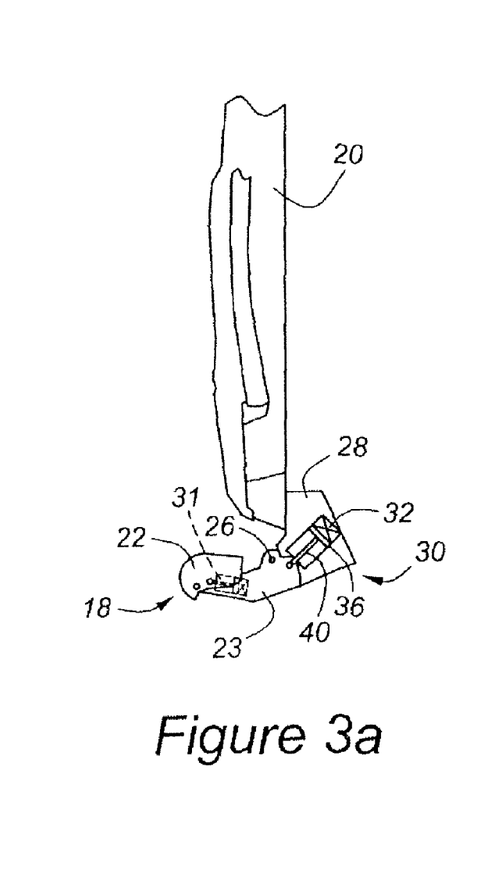
FIGS. 3a-3c illustrate a deployment sequence for a second embodiment of a step bar according to the present invention.
Figure 3B:
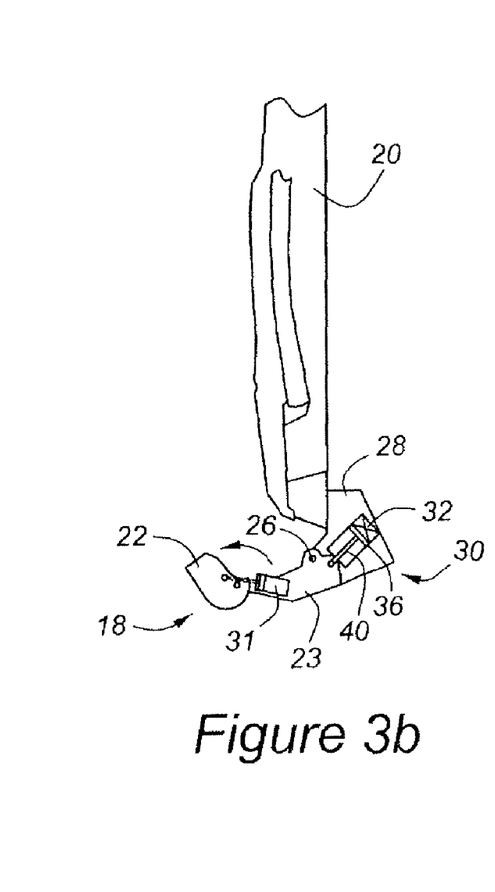
Figure 3C:
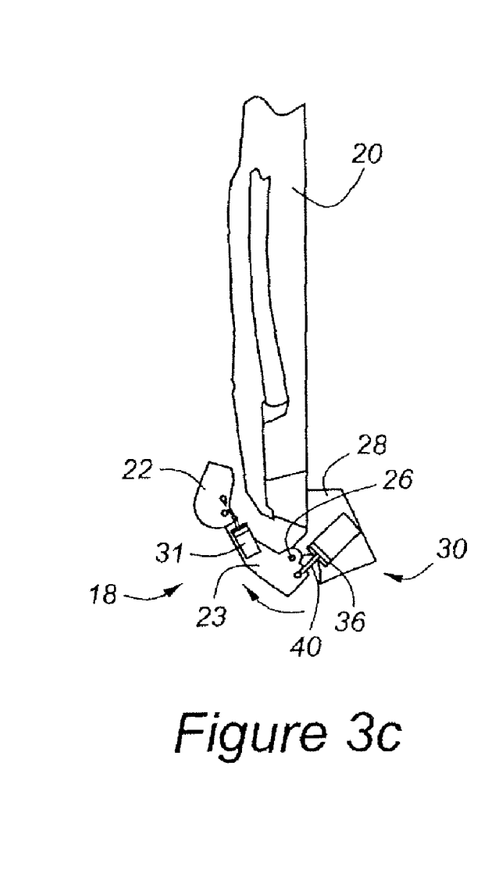

FIGS. 3a-3c illustrate an embodiment in which a pyrotechnic device, 30, including a propellant, or gas generator, 32, acts upon a piston, 36, and through a link, 40, so as to rotate brackets 23 and step beam 22. As an alternative, gas generator 32 may consist of a container of compressed gas released by a pyrotechnic squib. In essence, two types of gas devices may be employed in the present system. With the first, a solid propellant generant may provide the gas. The second embodiment, as described above, uses a tank of compressed gas, which is released within milliseconds.

Pyrotechnic device 30 may be triggered by means of a controller which is either stand-alone, or is used to control other impact countermeasure devices such as airbags, seatbelt tensioners, or an adaptive steering column. A second pyrotechnic device, 31, is used in the embodiment of FIGS. 3a-3c to rotate step beam 22 in a direction opposite to the direction of the rotation driven by pyrotechnic device 30. When rotated to the final position shown in FIG. 3c, the full structural strength of step beam 22 is available to assist in the avoidance of intrusion of bumper 14 into door 20.

Figure 4A:
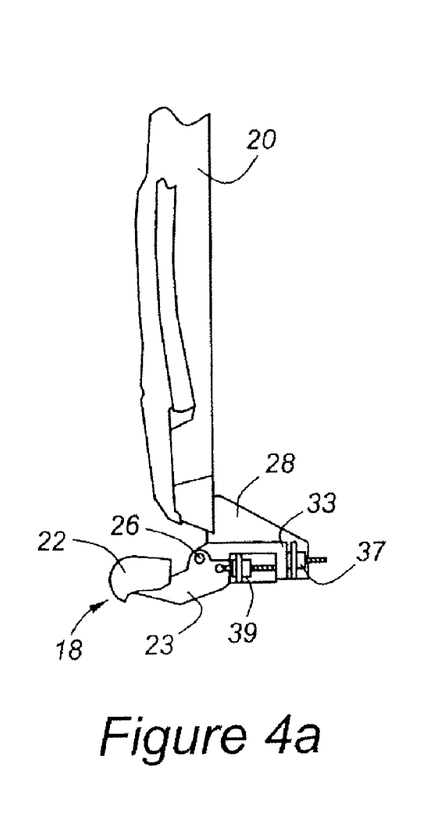
FIGS. 4a-4c illustrate a deployment sequence for a third embodiment of a step bar according to the present invention.
Figure 4B:
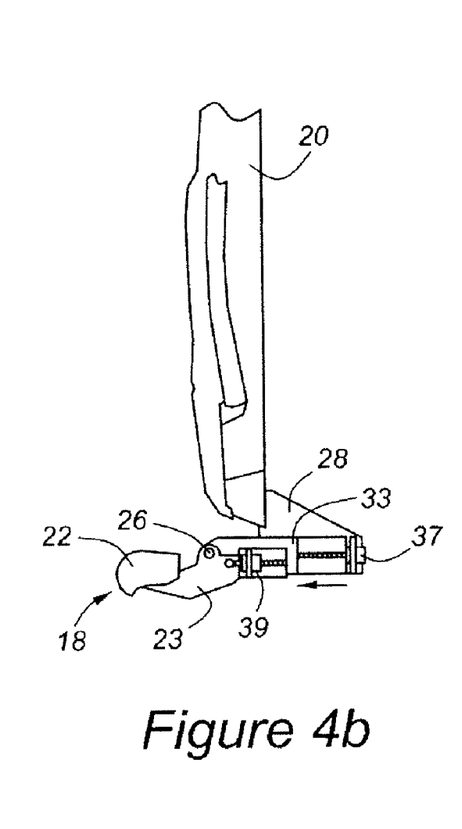
Figure 4C:
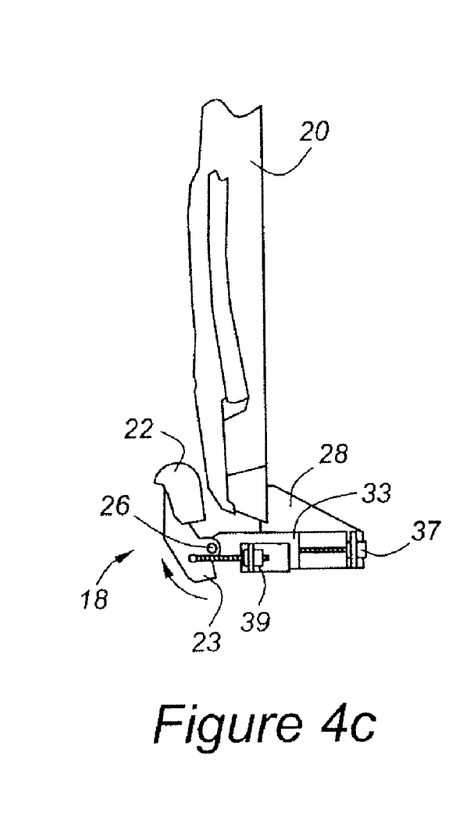

FIG. 4 shows an alternative construction in which step beam 22, brackets 23, and linear motor 39 are all attached to a slide, 33, which is connected to a second linear motor, 37. In this embodiment, linear motor 37 first extends slide 33, and then beam 22 is rotated by linear motor 39. Those skilled in the art will appreciate in view of this disclosure that gas devices, using either pyrotechnically generated, or compressed gas, could be substituted for either or both of linear motors 37 and 39.

Figure 8:
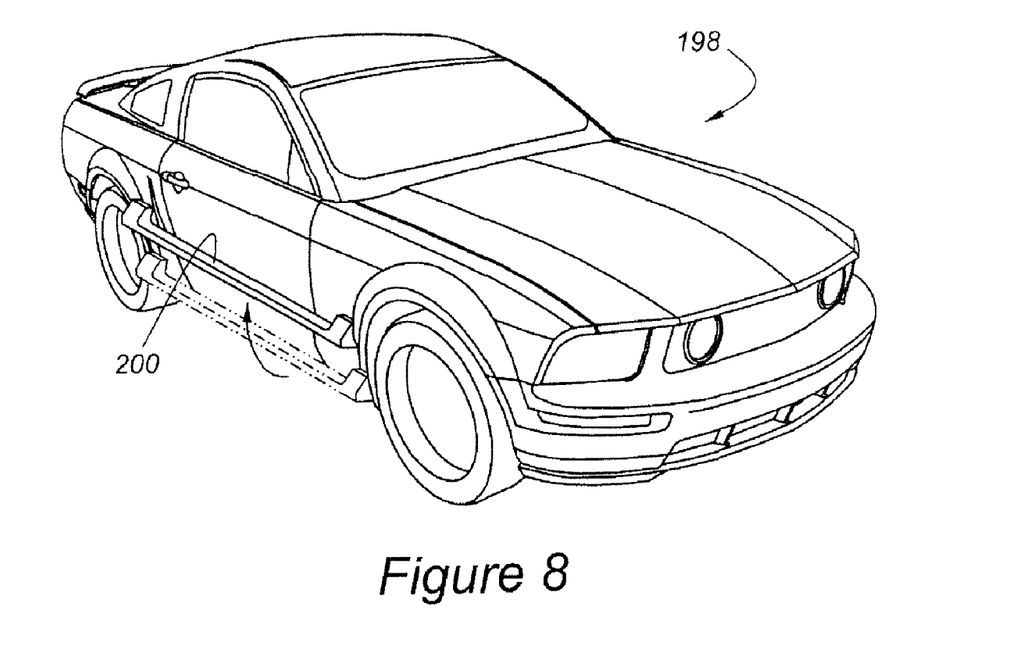
FIG. 8 is a perspective view of a vehicle having yet another embodiment of a side impact protection system according to the present invention.
Figure 9:
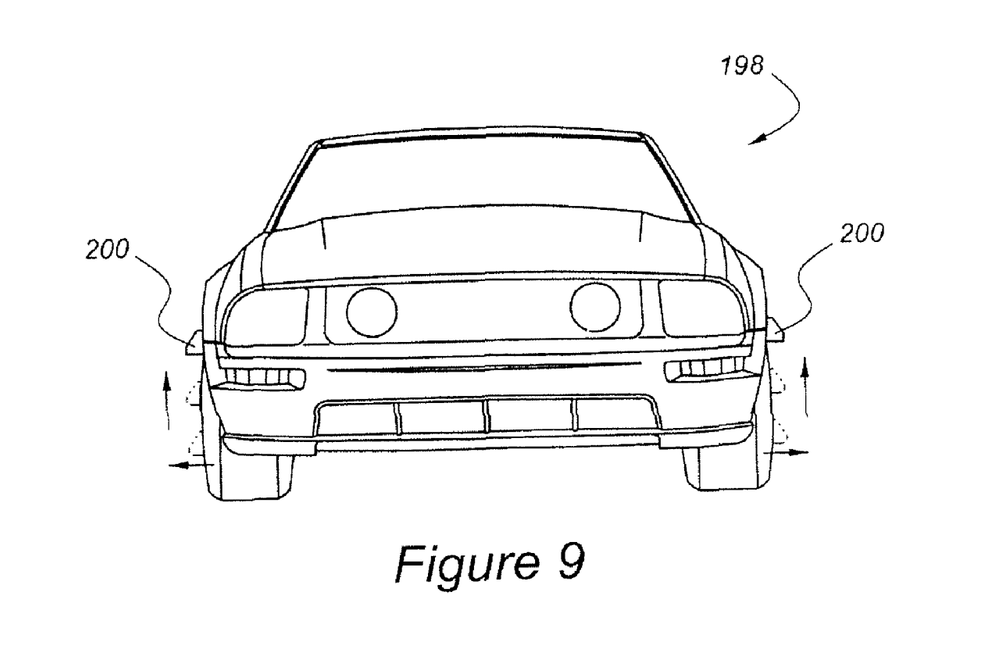
FIG. 9 is a frontal elevation of the vehicle shown in FIG. 8.
Figure 10:
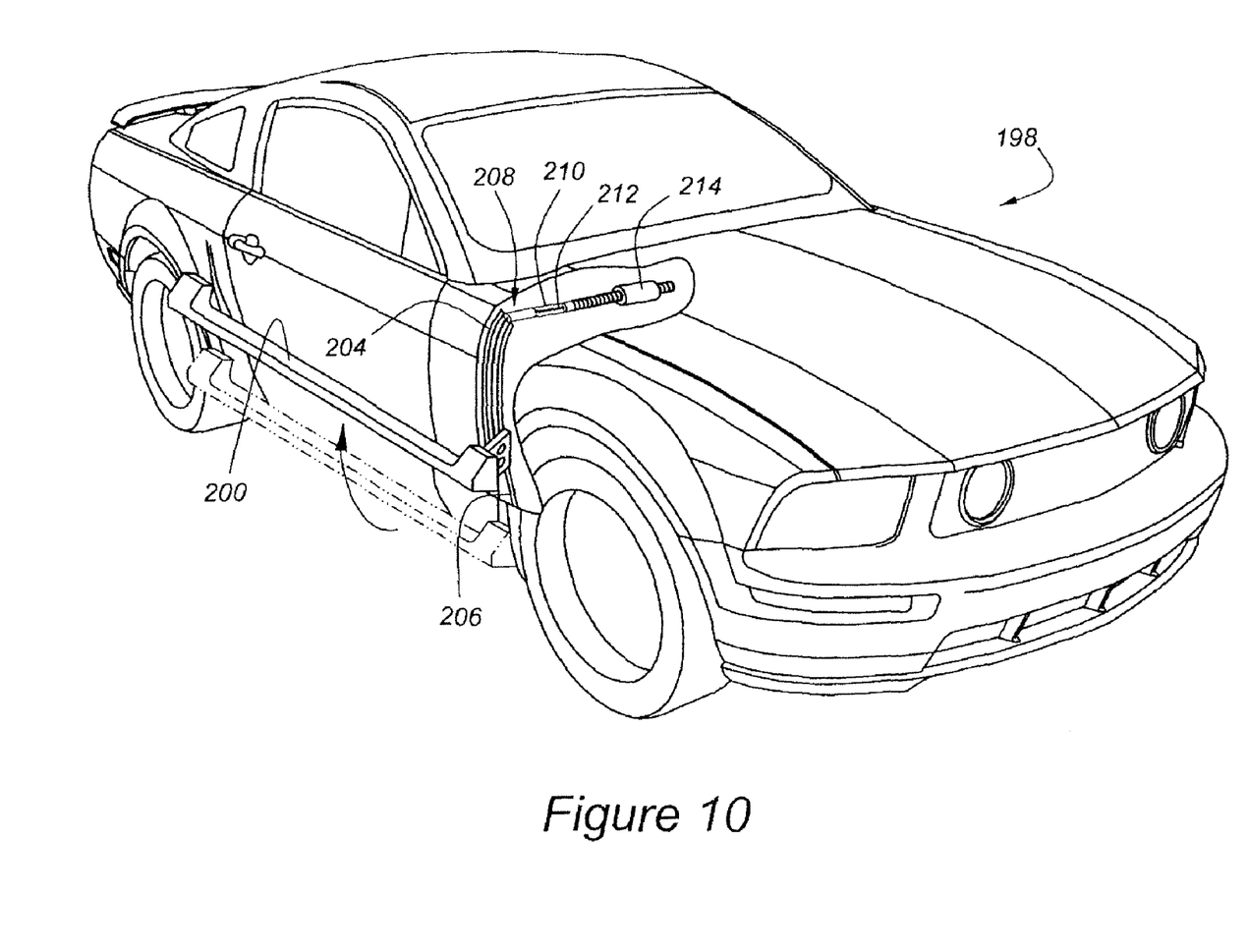
FIG. 10 is a perspective view, partially cut away, of the vehicle depicted in FIGS. 8 and 9.

In the embodiment of FIGS. 8-10, vehicle 198 has a supplemental impact protection system wherein the energy management structure includes a guard beam, 200, adapted to extend longitudinally along vehicle 198, with guard beam 200 being mounted upon rollers (not shown) carried within generally vertically extending track segments 204 mounted to front and rear portions of vehicle 198. Drive motor 214 and push-pull cable 208, having a core, 212 and sheath, 210, move guard beam 200 into its second, or deployed, position by pulling beam 200 upwardly along track segments 204.

FIG. 5 is a block diagram showing a system of the present invention, including controller 50, which assesses an impact potential of vehicle 10 and operates beam mounting system 54, including either pyrotechnic device 30, or linear motor 44, to deploy energy management structure 64. Those skilled in the art will appreciate in view of this disclosure moreover, that not only step beam 22, or guard beam 200, could be used, but also running board devices, or yet other energy management devices which are suitable for moveable mounting to either the sides or ends of an automotive vehicle.

Controller 50 assesses the impact potential by means, for example, of a pre-crash sensor. Such sensors are known to those skilled in the art and are beyond the scope of this invention. In any event, if an impact event is sensed, pyrotechnic device 30 will be activated to as to raise step bar 22 or guard beam 200, to its raised or deployed position. Controller 50 receives inputs from a plurality of sensors 56, such as the previously mentioned pre-crash sensor, as well as from a vehicle gear selector sensor, a vehicle speed sensor, an ignition switch, and a door switch. Many of sensors 56 may be either integral with controller 50 or distributed about vehicle 10. Mounting system 54 shown in FIG. 5 may comprise not only the illustrated mounting system but also other mounting systems suitable for practicing the present invention. The energy management structure, 64, illustrated in FIG. 5 may be embodied not only as step bar 22, but also as guard beam 200, or yet other deployable devices. Finally, as shown in FIG. 5 controller 50 may be used to operate a plurality of countermeasure devices, 60, in addition to the supplemental impact protection system described herein.

FIG. 6 is a flow diagram illustrating deployment of the present system, with particular reference to linear motor 44 illustrated in FIG. 2. Motor 44 typically would be sized in such a manner as to provide economy in terms of weight and power consumption, with a compromise in terms of time response. In other words, linear motor 44 cannot act with the extremely high speed of response characterizing pyrotechnic device 30. As a consequence, the deployment of a system using an electric motor to deploy the energy management structure is handled differently than a system using either compressed gas or a pyrotechnic device. Accordingly, at block 72 of FIG. 6 a question is asked to as to whether the vehicle's ignition switch is on. If the ignition is on, a question is asked at block 74 as to whether the vehicle doors are closed. If the doors are closed, the logic moves to block 76, wherein a question is asked about whether the transmission is in drive. If the answer is yes, and if the vehicle's speed is above 5 miles an hour at block 78, step beam 22 will be deployed at block 80. In other words, at block 80 the routine has determined that the vehicle's impact potential has satisfied a predetermined threshold defined as being in a forward gear at a speed above five miles per hour. Then, at block 82 the drive sequence logic begins. Thereafter, if the ignition has been turned off at block 84, or if a door has been opened at block 86, or if the transmission has been placed in park at block 88, step beam 22 will be lowered at block 90.

Figure 7:
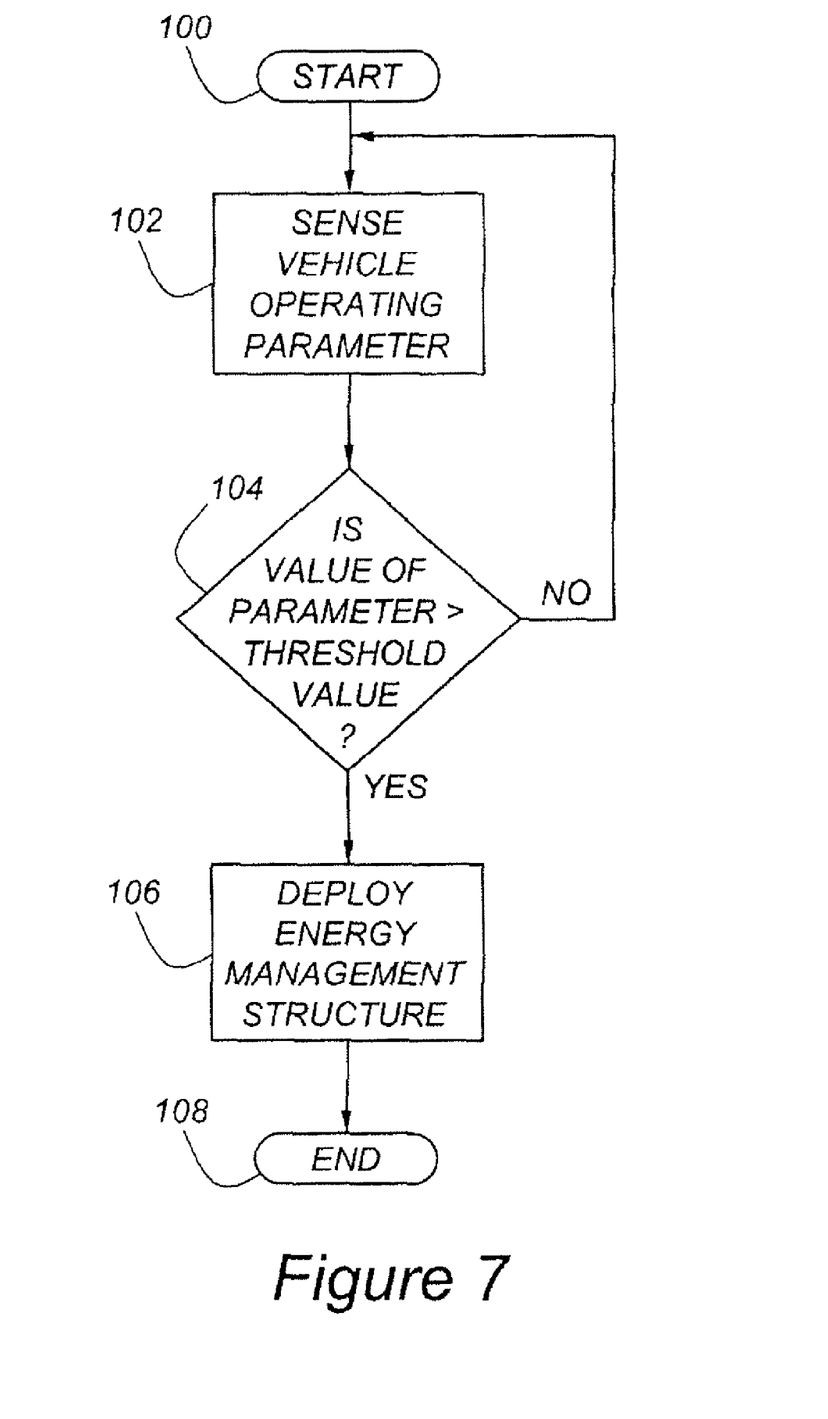
FIG. 7 is a second flow chart illustrating a more generic method of employing a system according to the present invention.

FIG. 7 illustrates logic for use particularly with pyrotechnic device 30, including either a compressed gas source or a solid propellant generant. A compressed gas device will allow higher pressures within the power cylinder for a longer period of time inasmuch as heat is not used as one of the drivers for the generation of pressure within the power cylinder. As shown in FIG. 7, the logic starts at block 100, and then moves block 102, wherein vehicle operating parameters are sensed. These parameters may, as noted above, include pre-crash proximity sensing of a closing or intersecting vehicle. Thus, at block 104 if a value of a sensed deployment triggering parameter is greater than a predetermined threshold value, for example, if an impact against the vehicle is determined to be imminent, the logic moves to block 106, wherein the energy management structure of the present invention is deployed. The method ends at block 108, it being understood that in an impact event there is no need for the system to do anything further once the energy management structure has been deployed.

Although the present invention has been described in connection with particular embodiments thereof, it is to be understood that various modifications, alterations, and adaptations may be made by those skilled in the art without departing from the spirit and scope of the invention set forth in the following claims.

What is claimed:

1. A supplemental impact protection system for an automotive vehicle, comprising:
   an external energy management structure comprising a step beam having a first, lowered position for normal vehicle operation and a second, raised position for deployment during an impact event;
   a mounting system for fastening said energy management structure to a vehicle and using at least one gas device to rotatably position the energy management structure in said second position in real time during an impact; and
   a controller for assessing an impact potential of a vehicle and for operating said at least one gas device to move said energy management structure to said second position in the event that the assessed impact potential satisfies a predetermined threshold.

2. A supplemental impact protection system according to claim 1, wherein said at least one gas device has a pyrotechnic source for moving said energy management structure into said second position.

3. A supplemental impact protection system according to claim 1, wherein said at least one gas device comprises a device having a supply of high pressure gas for moving said energy management structure into said second position.

* * * * *